No. 752,359.   Patented February 16, 1904.

UNITED STATES PATENT OFFICE.

JOHN JEFFERSON REED, OF LABELLE, MISSOURI.

SYRUP.

SPECIFICATION forming part of Letters Patent No. 752,359, dated February 16, 1904.

Application filed May 13, 1903. Serial No. 156,992. (No specimens.)

*To all whom it may concern:*

Be it known that I, JOHN JEFFERSON REED, a citizen of the United States, residing at Labelle, in the county of Lewis and State of Missouri, have invented a new and useful Syrup for Table Use, of which the following is a specification.

The invention relates to a syrup for table use.

The object of the present invention is to provide for table use a high-grade syrup which will be superior to the ordinary table-syrups on the market at the present time and which is designed to take the place of strained honey.

A further object of the invention is to provide a sweet, delicious, and palatable syrup having a honey flavor and adapted to be manufactured and sold much cheaper than strained honey.

The invention also has for its object to provide a table-syrup of this character adapted to be manufactured advantageously in large quantities for shipment and sale and capable also of being readily put up by families for their own use.

The syrup consists of the following ingredients, combined in the proportions stated, viz: granulated sugar, 43.25 parts; common brown sugar, 25.95 parts; soft water, 20.62 parts; pure bee honey, (strained,) 9.64 parts; powdered alum, .18 parts; cream of tartar, .18 parts; rose-water, (fresh,) .18 parts; total, one hundred parts.

The above formula is adapted to be conveniently put up by families for their use; but when the syrup is manufactured for sale the following formula is employed: granulated sugar, 27.12 parts; common brown sugar, 27.12 parts; glucose, 18.08 parts; soft water, 18.08 parts; pure bee honey, (strained,) 9.04 parts; cream of tartar, .28 parts; rose-water, (fresh,) .28 parts; total, one hundred parts.

This syrup is prepared in the following manner: Thoroughly mix the sugar, water, and glucose (when glucose is employed) and place over a fire. The mixture is heated until boiling-point is reached and is allowed to boil two minutes. Then skim thoroughly. The cream of tartar and alum (when alum is used) are then added to the mixture, which is permitted to boil two minutes. The honey and rose-water are then added, and the mixture is again permitted to boil for two minutes. It is then removed from the fire and strained through a thin cloth before cooling. Stirring of the mixture while boiling should be avoided.

The sugar constitutes the main body of the syrup, and the granulated and brown sugars are used to secure the desired flavor and color. The alum and cream of tartar prevent granulation and assist in securing the desired flavor. The rose-water is used for flavoring the syrup, and the soft water gives the desired consistency. In the second formula the alum is omitted on account of the prejudice against its use. The glucose assists the cream of tartar in preventing granulation and also cheapens the product.

What is claimed is—

1. The herein-described table-syrup consisting of granulated sugar, brown sugar, soft water, pure bee honey (strained), cream of tartar, and rose-water, substantially as described.

2. The herein-described table-syrup, consisting of granulated sugar, brown sugar, water, strained honey and cream of tartar.

3. The herein-described table-syrup consisting of granulated sugar, brown sugar, glucose, soft water, pure bee honey (strained), cream of tartar and rose-water.

In testimony that I claim the foregoing as my own I have hereto affixed my signature in the presence of two witnesses.

JOHN JEFFERSON REED.

Witnesses:
L. G. WRIGHT,
J. G. RICHMOND.